Patented June 18, 1940

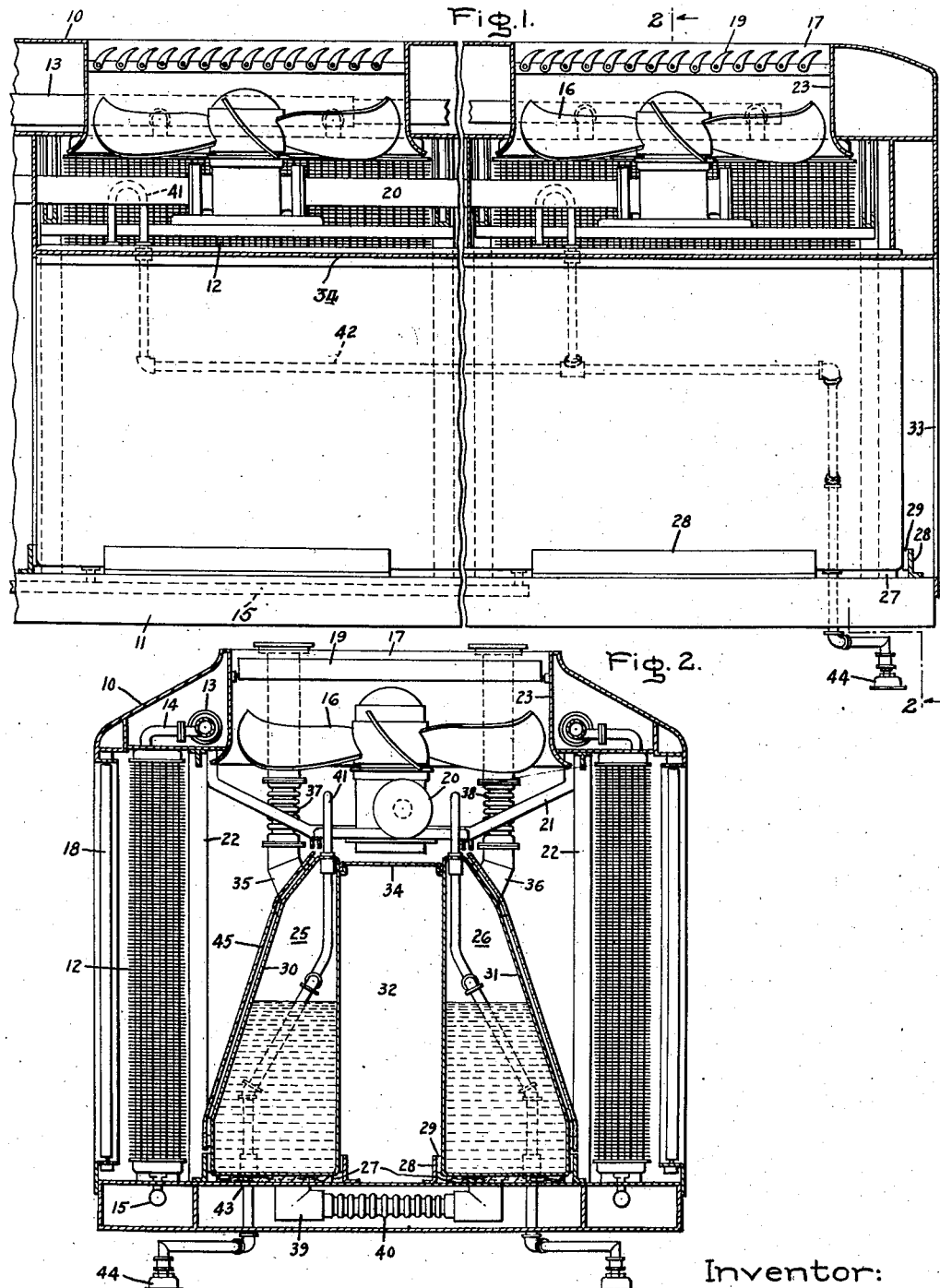

2,205,280

UNITED STATES PATENT OFFICE 2,205,280

LOCOMOTIVE VEHICLE

Basil S. Cain, Erie, Pa., assignor to General Electric Company, a corporation of New York Application October 1, 1938, Serial No. 232,845

2 Claims. (Cl. 105—38)

The present invention relates to locomotive vehicles and more particularly to liquid fuel storage reservoirs for locomotives. Although not necessarily limited thereto, the invention is especially applicable to turbine driven railway locomotives of the condensing type having a heat exchanger compartment for condensing the exhaust fluid from the turbines.

Locomotives of the type referred to embody condenser units usually of the surface cooled type utilizing air as the cooling medium, which air is drawn through inlet openings provided in the side walls of the locomotive cab structure and, after passing in contact with the surface of the condensing apparatus, is exhausted through outlet openings provided in the roof. Limitations in the overall size of the locomotive demand an economical and efficient utilization of the available space within the cab.

It is an object of this invention to provide a new and improved arrangement of liquid fuel storage reservoirs in a railway locomotive vehicle.

It is a further object of this invention to provide a new and improved arrangement of a plurality of liquid fuel storage reservoirs in the heat exchanger compartment of a locomotive vehicle, which reservoirs are separately removable and are so disposed as to provide a central passageway through the compartment, the outer walls of the reservoir tanks being so shaped as to define suitable passages for the air circulated through the heat exchanger units.

According to my invention, liquid fuel storage tanks are provided in the heat exchanger compartment which are of such shape as to utilize a maximum of the available space within the compartment and at the same time defining passageways for the most efficient circulation of the condenser cooling air.

The features of novelty which I desire to protect herein will be pointed out with particularity in the appended claims. The invention itself together with further objects and advantages thereof will best be understood by reference to the following description taken in connection with the accompanying drawing.

In the drawing, Fig. 1 is a side elevation of the condenser compartment of a railway locomotive cab, partly in section, embodying my invention, and Fig. 2 is a cross-sectional view therethrough taken along the line 2—2.

Referring to the drawing, 10 is the locomotive cab or housing supported upon a base frame structure 11. A plurality of heat exchanger or condenser units 12 for condensing the exhaust fluid from the power plant turbine (not shown) are arranged along the opposite side walls of the cab. The exhaust fluid is conducted from the turbines to the condenser units through the conduits 13, 14 while condensate is drained therefrom as by conduits 15 to the hot well (not shown). Cooling air is drawn through the oppositely arranged condenser units by means of blowers 16 and discharged through openings 17 in the roof. Suitable louvers 18 are provided in the side wall openings adjacent each condenser unit and louvers 19 are provided in the roof openings for regulating the air flow through the compartment. The blowers may be of any suitable type and in this instance are shown as being driven from a common shaft 20 extending through the condenser compartment from a common prime mover (not shown) which may be arranged in the power plant compartment. The blowers are preferably mounted adjacent the roof openings by means of supports 21 secured to the vertical cab frame members 22. Liners 23 are provided in the roof opening having a circular lower portion or orifice surrounding the blower blades.

According to my invention, a pair of similar liquid fuel storage tanks 25 and 26 are arranged between the oppositely disposed condenser units, which tanks may extend the length of the condenser compartment. The tanks rest upon the base frame structure 11, intermediate resilient spacers, such as wooden blocks 27, being provided between the tanks and the base frame to prevent metallic contact therebetween. Angle brackets 28 and spacers 29 arranged around the lower side walls of the tanks retain the tanks in proper position. By this tank mounting arrangement, warping movements of the locomotive framework, when the vehicle is passing over uneven roads, will not set up rupturing stresses in the tanks. The outer side walls 30 and 31 of the tanks, respectively, slope inwardly toward the top so as to define passageways for the air drawn through the condenser units. By properly dimensioning the tanks and the slope of the outer side walls, the passages directing the air upwardly from the condensers to the blowers can be designed for maximum efficiency of the air flow therethrough while a minimum of waste space will be created. The tanks are spaced apart to provide a central passageway 32 extending through the condenser compartment allowing access to the operators' compartment from the after connected cars through a door suitably arranged in the cab end wall 33. A sheet 34 extends across the space between the upper ends of the tanks to enclose the passageway and to preclude air from being drawn by the blower therethrough, thereby insuring a more complete circulation of cooling air through the condenser units.

Conduits 35 and 36 communicating with the upper interiors of each of the tanks 25 and 26, respectively, extend upwardly through the roof and through which the fuel may be fed into the reservoirs. Flexible sections 37 and 38 in each of the conduits 35 and 36 respectively, preclude the transmission of stresses from the cab structure therethrough to the tanks. A connection 39 having a flexible section 40 therein communicates between the lower portions of the two tanks for the purpose of equalizing the liquid level therein. The tanks may be vented in any suitable manner, such as by the arrangement shown which includes inverted U-tubes 41 extending upwardly from the top of each tank to preclude the fuel from splashing out of the tanks through the vent openings. One end of each U-tube is in open communication with the interior of the tank while the other end connects with a pipe 42. For convenience the pipes 42 are arranged within the tanks and extend through the bottom as at 43 to atmosphere. A suitable safety device 44 is provided at the end of each vent pipe for precluding the possibility of a flame passing therethrough to the interior of the reservoirs.

In operation, with the blowers drawing air across the surfaces of the condensers, a certain amount of heat will be absorbed by the tanks insuring a freely flowing condition of the fuel. As a general rule, however, it is necesary to protect the tanks against overheating and resultant excessive vaporization of the fuel, so I prefer to provide a sheet of heat insulating material 45 over the sloping outer surfaces of the tanks substantially as indicated. By suitably spacing the insulating material from the surface of the tanks, and by the proper selection of material, the heat transfer can be limited in accordance with the requirements.

By the arrangement of the fuel reservoirs as shown in the end of the locomotive, they may easily be removed after removing suitable sections of the end wall 33 of the locomotive cab tructure. It will only be necessary to disconnect the various vent pipes, filling spout connections, level equalizing connections, and the like, and the tanks may be slid longitudinally from the compartment for repair or replacement.

Thus, with my invention I have accomplished an improved construction and arrangement of motor vehicles having surface type heat exchangers with sections located on opposite sides of the center line of the vehicle and arranged to receive cooling air through openings formed in the framework of the vehicle. In the particular arrangement described above, the cooling air flows through openings in the sides and is discharged through an opening in the roof of the vehicle. A reservoir in accordance with my invention is arranged to form spaced sections on opposite sides of the center of the vehicle with adjacent walls of the sections spaced to define a central passageway along the vehicle. The outer walls of these sections are heat-insulated and sloped upwards toward the vertical center line of the vehicle and together with the openings in the sides and the roof of the vehicle form a path for air through the heat exchanger. The sections are vented through a safety device and connected by a liquid level equalizing conduit.

Having described the principle of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States is:—

1. In a motor vehicle, a heat exchanger compartment, air cooled surface heat exchangers arranged in said compartment, inlet and outlet openings for cooling air in said compartment, a blower arranged adjacent the outlet opening for drawing cooling air through said heat exchangers, means including a pair of spaced apart liquid storage reservoirs defining parts of air passageways between said heat exchangers and said blower and an enclosed passageway partly formed by the spaced-apart reservoirs through said compartment, means resiliently supporting the reservoirs in the compartment, and resilient conduit means communicating between the lower portions of said reservoirs for maintaining a substantially equal distribution of liquid therein.

2. In a motor vehicle, a heat exchanger compartment, air cooled surface heat exchangers arranged along the opposite side walls of said compartment, openings for cooling air in said side walls, an outlet opening in the roof of said compartment, a blower arranged adjacent said outlet opening for drawing cooling air through said heat exchangers, means for supporting the blower from the vehicle framework, a pair of liquid storage reservoirs spaced apart in said compartment and forming a central passageway therethrough, the outer side walls of said reservoirs defining parts of air passageways from said heat exchangers to said blower, and means for relatively resiliently supporting said reservoirs in said compartment whereby said reservoirs are protected against stresses due to warping movements of said vehicle.

BASIL S. CAIN.